US007606173B2

(12) United States Patent
Lal (10) Patent No.: US 7,606,173 B2
(45) Date of Patent: Oct. 20, 2009

(54) APPARATUS, METHOD, AND SYSTEM FOR MINIMUM NEIGHBOR ASSURANCE IN DEPLOYMENT OF NODES IN A MULTIHOP WIRELESS NETWORK

(75) Inventor: Dhananjay Lal, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 475 days.

(21) Appl. No.: 11/513,744

(22) Filed: Aug. 30, 2006

(65) Prior Publication Data

US 2008/0056162 A1 Mar. 6, 2008

(51) Int. Cl.
 *H04L 12/28* (2006.01)
(52) U.S. Cl. .................. 370/254; 370/328; 370/392; 370/401
(58) Field of Classification Search .................. None
See application file for complete search history.

(56) References Cited

U.S. PATENT DOCUMENTS

| 2004/0114557 | A1 | 6/2004 | Bryan et al. |
| 2004/0240474 | A1* | 12/2004 | Fan .............................. 370/475 |
| 2005/0078672 | A1 | 4/2005 | Caliskan et al. |
| 2005/0254430 | A1* | 11/2005 | Clark et al. ................. 370/241 |
| 2006/0056456 | A1 | 3/2006 | Ratiu et al. |
| 2007/0242642 | A1* | 10/2007 | Bronez ....................... 370/338 |

* cited by examiner

*Primary Examiner*—Bob A Phunkulh
(74) *Attorney, Agent, or Firm*—Kenyon & Kenyon LLP (57) ABSTRACT

In a network installation method and system, a first message is broadcast, a number of second messages received in response to the first message is counted and/or a type of at least one of the second messages is determined, and it is determined whether a location of a first node of a network is suitable based on the determined number of received second messages and/or the determined type of received second message(s).

22 Claims, 7 Drawing Sheets

APPARATUS, METHOD, AND SYSTEM FOR MINIMUM NEIGHBOR ASSURANCE IN DEPLOYMENT OF NODES IN A MULTIHOP WIRELESS NETWORK

FIELD OF THE INVENTION

The present invention relates to a node and method for deployment of nodes in a multihop wireless network, where the system and method helps ensure that each deployed node has sufficient communication paths to a base node.

BACKGROUND INFORMATION

Wireless networks including a plurality of nodes are used for various purposes. An exemplary wireless network includes statically located nodes in a distributed environment. The nodes may include sensors for obtaining information about an environment. Such sensors include, for example, smoke detectors, detectors for detection of harmful chemicals, security breach detectors, etc. The nodes transmit data, for example, that include information obtained from the sensors, to a node designated as a base node for analysis. In some networks, a node is designated as a base node for receiving reports from a plurality of other nodes and/or for transmitting instructions to the plurality of nodes, for example, in response to analysis of data received from other nodes. Base nodes may include higher powered devices than those of other nodes. A node may be designated as a base node since it is a node with which a user may have more direct interaction than other nodes. A node may be designated as a base node for purposes of configuring a network topology. A base node, as referred to herein, is a node designated as such regardless of whether there are any inherent differences between the node and other nodes. However, inherent differences may be the designation. A node that is not designated as a base node is referred to herein as a field node. The term node without further description, as used herein, encompasses base and field nodes.

Network nodes may be organized in a number of alternative ways. One organization of nodes provides for a multihop communication, in which a node that initiates transmission of data (source node) for receipt ultimately by another node (destination node) transmits the data to intermediate nodes that pass the data on until the data is received by the destination node. For example, a field node may transmit its data to one or more intermediate nodes that transmit the data to one or more other nodes until the data is received by a base node.

Low powered devices may be used as nodes because of cost considerations. Sophisticated protocols are implemented for communication by nodes with their peers in a way that conforms to an energy budget that provides for a low rate of power consumption. The low powered devices may be battery operated and include low power radios. Power at which the radios communicate may be about 0 dBm. The low power communication renders communication susceptible to noise interference and/or attenuation. Interference may occur where multiple networks communicate via a same frequency band in a same area or in proximate areas. Particularly, where communication between a source node and a destination node, e.g., a particular field node and a base node, occurs via a communication path that includes numerous intermediate nodes, the risk of interference and attenuation rises.

While the locations at which nodes are statically installed depend on the particular system requirements for which the network is provided (for example, particular sensing needs), the system requirements may allow for flexibility in the selection of the precise locations. For a more precise determination of the locations, effects of the node layout on the risk of interference and attenuation may be considered. In this regard, a layout is chosen that provides for a number of paths over a certain predetermined threshold number between field nodes and a base node, in particular for those field nodes that communicate with the base node via intermediate nodes, i.e., indirectly. Such redundancy increases the probability of a message reaching an intended node.

For determining a layout according to which nodes are to be installed, a simulation analysis may be performed. A simulation analysis takes into account a communication range of the nodes and an overlap of the ranges in a particular layout. However, simulation analyses are inaccurate and expensive, both monetarily and with respect to time.

Accordingly, there is a need for a system and method that efficiently aids in selection of a layout for wireless multihop network nodes.

SUMMARY

According to an example embodiment of the present invention, a network installation method may include: broadcasting a first message; (a) counting a number of second messages received in response to the first message and/or (b) determining a type of at least one of the second messages; and based on the number and/or the type, determining whether a location of a first node of a network is suitable.

The first message may be broadcast by the first node to all of at least one second node of the network that is in a communication range of the first node.

The method may further include transmitting the second message to the first node by each of the at least one second node that receives the first message upon a condition that the second node has been deployed into the network and/or determined to be in a suitable location.

The method may further include: selecting by each of the at least one second node that receives the first message one of a corresponding plurality of time offsets; and transmitting the second message to the first node by each of the at least one second node that receives the first message and that satisfies any conditions for transmitting the second message after passage of the second node's selected time offset from a first possible transmission time, which may be at an end of the broadcasting of the first message.

The method may further include entering by at least one node, e.g., all nodes, of the network into a sleep mode. The sleep mode may be maintained for a predetermined time. The first message may be a tone that is broadcast for a time that is longer than the predetermined time.

The number of the plurality of offsets that are selectable by a particular one of the at least one second node may be determined, for example, based on an estimated number of nodes expected to be in a communication range of the particular node, an area about the particular node having a radius equal to twice a radius of the communication range of the particular node, or an expected most node populous node communication range, which is a node communication range populated with more nodes than any other node communication range of a given universe of communication ranges, that falls completely within the area.

Each offset may be equal to a multiple of a period of time that is at least as long as a transmission time of the second message.

The method may further include waiting for a period of time beginning at the end of the broadcasting of the first message before determining whether the location is suitable.

The period of time for waiting may be determined, for example, based on an expected highest number of offsets selectable by, e.g., any single one of at least one node expected to be within the communication range of the first node.

A range of possible transmission start times that may be selected may be limited to start times that ensure that, of a plurality of second messages transmitted in response to the first message, transmission times of any message pair may completely overlap or otherwise not overlap at all.

In particular, the range of possible transmission start times that may be selected may be so limited for maximization of a number of the plurality of second messages that are received.

The type of second message received may be either a first type transmitted by a base node or a second type transmitted by a field node.

The location may be determined to be suitable if and conditional upon that the number counted is greater than a predetermined number and/or at least one first type of second message has been determined to have been received.

According to an example embodiment of the present invention, a network node may include: a transmitter to broadcast a first message; a receiver to receive messages; a counter to be incremented in response to receiving each received second message transmitted in response to the first message; and an output arrangement to provide an output indicating whether a location of the network node is suitable. The location may be considered suitable at least if a value of the counter is greater than a threshold value. The output may be, for example, the value of the counter.

According to an example embodiment of the present invention, a network may include: a base node; and a plurality of field nodes, the plurality of field nodes including at least one node that includes: a transmitter to broadcast a first message; a receiver to receive messages; a counter to be incremented in response to receiving a second message transmitted in response to the first message; and an output arrangement to provide an output indicating whether a location of the at least one node is suitable. The location may be considered suitable if (a) a value of the counter is greater that a threshold value and/or (b) the at least one node receives directly from the base node a message transmitted by the base node in response to the first message.

The network node may further include: an arrangement for determining whether the location is suitable; and an arrangement for automatically performing a deployment procedure if it is determined that the location is suitable.

According to an example embodiment of the present invention, a network installation method may include: deploying a base node; subsequently installing at least one first field node, each of which has an estimated communication range in which the base node is located; for each of the at least one first field node: determining whether the field node's location is suitable; and deploying the field node if it is determined that the field node's location is suitable; installing at least one second field node, each of which has an estimated communication range in which the base node is not located, if a number of deployed ones of the at least one first field node is above a threshold number; and for each of the at least one second field node, determining whether the field node's location is suitable and deploying the field node if it is determined that the field node's location is suitable.

Determining whether a particular node's location is suitable may include: instructing the particular node to broadcast a first message and (a) count a number of received second messages transmitted in response to the first message and/or (b) determine a type of at least one of the received second messages; and in response to the instructing of the particular node, receiving data from the particular node indicating whether the particular node's location is suitable, the output being based on the count and/or the type.

A particular node's location may be determined to be suitable if it is determined that in a communication range of the particular node is the base node and/or are field nodes numbering more than the threshold number.

DETAILED DESCRIPTION

Exemplary embodiments of the present invention relate to a system and method that may aid a node installer in selecting a node layout. A field node may output data indicating whether its placement satisfies predetermined layout criteria. The output data may be based on communications between the field node and neighboring nodes.

Figure 1:
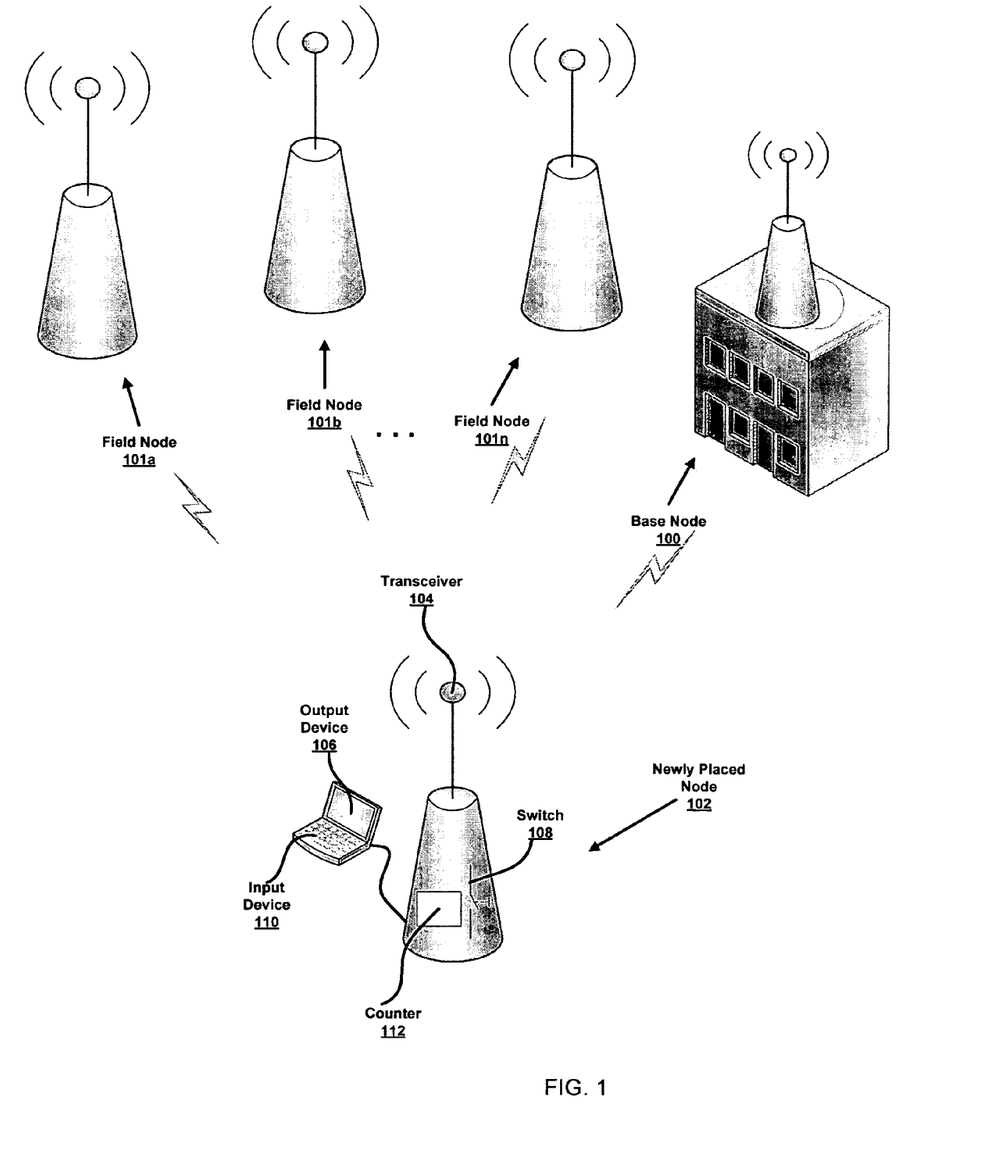
FIG. 1 is a block diagram that illustrates example components of a system according to an example embodiment of the present invention.

FIG. 1 is a block diagram that illustrates components of an exemplary embodiment of the present invention. Each of a plurality of nodes (including a base node 100, previously placed field nodes 101a-n that have each confirmed that its placement is suitable, and a newly placed node 102, hereinafter referred to as a new node) may be capable of wireless communication between each other. They may each include a device for transmitting and receiving data, e.g., a transceiver 104. There may be more than one base node 100.

The new node 102 may include an output device. Alternatively, the new node 102 may include an output port to which an output device 106 may be connected, e.g., during installation. The output device 106 may be any suitably appropriate output device, such as a computer screen, projector, printer, and/or a display including one or more LEDs.

The new node 102 may include a trigger for triggering a communication procedure via which the new node 102 may determine whether its position satisfies predetermined criteria. The trigger may be a physical trigger, such as a switch 108, or a logical trigger, such as a particular input obtained via an input device 110. The input device 110 may be any suitably appropriate input device, such as a keyboard or touch-screen. A single device may be provided as both the input and output device. During installation, an installer may trigger the new node 102 to begin the communication procedure.

In response to the trigger, the new node 102 may broadcast a neighbor-acknowledge-request message, which may be received by all of the previously placed field nodes 101 and the base node 100 to which the neighbor-acknowledge-request message reaches. In response to the neighbor-acknowledge-request message, the receiving nodes may transmit to the new node 102 an acknowledgement message. The new node 102 may include a counter 112, which may be incremented upon each receipt of an acknowledgement message. Accordingly, the counter 112 may indicate whether a number of neighboring nodes with which the new node 102 can communicate meets a threshold number. After receipt of all acknowledgement messages, after receipt of a predetermined number of acknowledgement messages, and/or after an elapse of a predetermined time period, the new node 102 may output data indicating the number of determined neighboring nodes and/or whether the number of the new node's neighbors meets the threshold number. For example, in an embodiment in which an output device 110 attached to or included in the new node 102 is a single LED, the LED may be turned on to indicate that the threshold number has been met.

In an embodiment of the present invention, a new node 102 may determine that its location is suitable even if the number of its neighbors is below the threshold number, as long as the new node 102 determines that it can communicate directly with the base node 100. According to this embodiment, in response to a neighbor-acknowledge-request message, the base node 100 may transmit to the new node 102 a different acknowledgement message than that transmitted by field nodes 101. If the new node 102 receives the acknowledgement message unique to the base node 100, the new node 102 may output data indicating that its location is suitable, regardless of the number of acknowledgement messages it receives. Combinations of these variables may be used for determining whether the location is suitable. For example, in one embodiment the location may be determined to be suitable if either the number of received acknowledgement messages meets a first threshold number or if the number of received acknowledgement messages meets a second lower threshold number and an acknowledgement message is received from the base node 100.

In an embodiment of the present invention, a node that has not determined that its location is suitable or that has not been deployed into the network (which is discussed below) may refrain from transmitting an acknowledgement message in response to a received neighbor-acknowledge-request message. Accordingly, all acknowledgement messages received by the new node 102 may be from neighboring nodes that have determined their locations to be suitable and/or that have been deployed into the network in an established position, thereby avoiding a scenario where the new node 102 improperly determines its location to be suitable based on other new nodes that are subsequently moved so that they are no longer in a communication range of the new node 102.

In one variant of the previous embodiment, the system and method may provide for manually overriding the node's requirement of having determined that its location is suitable and/or of having been deployed to transmit an acknowledgement message in response to a received neighbor-acknowledge-request message.

Similarly, in an embodiment of the present invention, the system and method may provide for deployment of a new node into the network without the node first determining its location's suitability. Accordingly, if a new node 102 is one of a plurality of the network's first placed nodes, and if for the node 102 to determine that its location is suitable it is required for the node 102 to receive a number of acknowledgement messages that exceeds a predetermined threshold number, the node 102 may be deployed according to this embodiment without it first determining its location's suitability, or may be deployed according to the former two embodiments after it determines that its location is suitable based on acknowledgement messages received from non-deployed neighboring field nodes. Otherwise, deployment of all nodes may be prevented since no first node would receive sufficient acknowledgement messages.

In an embodiment of the present invention, for each new node, the threshold number of acknowledgement messages required for the node determining that its location is suitable may be individually set by an installer. According to this embodiment, the previous embodiment may be effectively achieved by setting the threshold number to 0.

In an embodiment of the present invention, a base node 100 may be deployed into the network without it determining its location's suitability. It may be positioned at any location chosen by the installer. For example, the location may be chosen by the installer based on anticipated approximate locations of one or more field nodes 101. Once the base node 100 is installed, field node locations may be determined in accordance with the base node's location. With respect to each new node 102, the system and method may provide for the new node 102 to determine whether its location is suitable. For example, the system may provide for the new node 102 to determine that its location is suitable if, and conditional upon that, at least one of two alternative conditions is satisfied. A first condition, referred to hereinafter as condition 1, may be that the new node 102 is in a communication range of the base node 100. Communication with the base node 100 may be sufficient since a base node 100 may include a transceiver 104 that is more powerful than that of a field node 101. It may therefore be assumed that if a base node 100 is in a communication range of the new node 102, messages transmitted between the new node 102 and the base node 100 will successfully reach the intended node. Further, it may be assumed that a best chance for a message transmitted from a source node to a destination node to reach the destination node is by a direct communication between the source and destination nodes, if possible. A second condition, referred to hereinafter as condition 2, may be that the new node 102 is in a communication range of a number of field nodes 101 that meets a threshold number. According to this embodiment, the base node 100 may transmit to the new node 102 an acknowledgement message that the new node 102 can recognize as originating from the base node 100. For example, while all field nodes 101 may transmit a first acknowledgement message type, the base node 100 may send a second acknowledgement message type.

Figure 2:
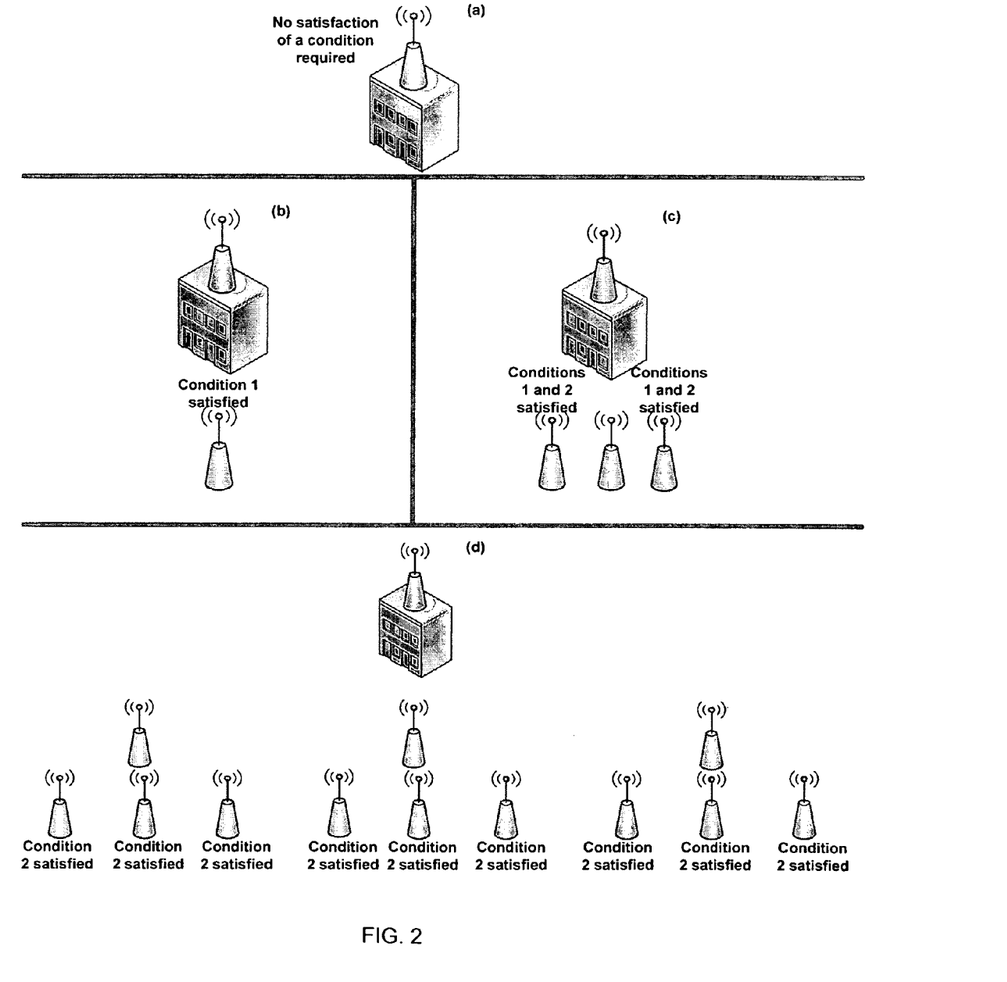
FIG. 2 is a diagram that illustrates a sequence of a gradual change in a network state according to an example embodiment of the present invention.

According to this embodiment, the wireless network may be installed according to a method illustrated in FIG. 2. In a first step, a base node 100 may be deployed without satisfaction of any condition, as shown in part (a) of FIG. 2. Subsequently, each of one or more new field nodes 102 may be deployed after the new field node 102 determines that its location is suitable based on satisfaction of condition 1, as shown in part (b) of FIG. 2. Subsequently, each of one or more additional new field nodes 102 may be deployed after the new field node 102 determines that its location is suitable based on satisfaction of either or both of conditions 1 and 2, as shown in part (c) of FIG. 2. Subsequently, each of one or more additional new field nodes 102 may be deployed after it determines that its location is suitable based on satisfaction of only condition 2, as shown in part (d) of FIG. 2. It will be appreciated that condition 1 is not necessary if the threshold number for condition 2 is one. It will also be appreciated that, while in one embodiment, it may be required for new nodes 102 satisfying only condition 2 to be installed subsequent to deployment or determination of location suitability by one or more field nodes 101 that satisfy conditions 1 and 2, even according to this embodiment, it is not required for all field nodes 101 satisfying conditions 1 and 2 to be previously installed. Instead, subsequent to part (d) of FIG. 2, additional field nodes 101 satisfying conditions 1 and 2 may be installed. According to this embodiment, it may be ensured that all deployed field nodes 101 have sufficient communication paths to the base node 100.

As provided by FIG. 2, a most efficient manner in which to gradually lay out a network may be breadth-first, where all field nodes 101 of a level are deployed before installation of new nodes 102 of a lower level, where the lower a node's level, the further it is from the base node 100 with respect to a number of hops required to communicate with the base node 100, since a breadth-first installation may provide most accurate information regarding a new node's satisfaction of conditions 1 and/or 2. However, an at least partially depth-first approach may be implemented, as explained. According to this embodiment, an installed new node 102 may at first determine that its location is unsuitable, but may subsequently determine otherwise if one or more additional nodes that satisfy either of conditions 1 and 2 are installed. It will be appreciated that not all nodes of a high level impact the suitability of a location of a node 102 of a lower level. For example, it may occur that nodes 101 of a high level positioned at a first side of the base node 100 are not in a communication range of a node 102 of a next lower level that is positioned at an opposite side of the base node 100.

In an embodiment of the present invention, a node may be limited to receipt of only one message at any single moment. Accordingly, if more than one neighboring node attempts transmission of an acknowledgement message at a same time, the messages may collide so that the new node 102 receives none of the acknowledgement messages. Further, transmission of an acknowledgement message may take a period of time 'T'. Even if beginnings of transmissions of more than one acknowledgement message are at different times, the acknowledgement messages may collide so that they are not received by the new node 102, if their periods of transmission T overlap. The representation by the number of the counter 112 of the new node's neighbors may therefore be significantly inaccurate.

The system and method of the present invention may provide for an acknowledgement message transmission protocol to at least partially increase the accuracy of the representation by the counter's number. The protocol may require each node that receives the neighbor-acknowledge-request message to select randomly a time offset added to a first time at which acknowledgement messages may be transmitted. The node may transmit its acknowledgement message after passage of its selected time offset. This protocol may allow different nodes to transmit acknowledgement messages at different times. In one embodiment of the present invention, selectable offsets may be limited to multiples of the period of time T, which may provide for either complete collision of messages (practically speaking) or no collision at all (practically speaking), so that messages sent after different offsets do not collide. A probability of receipt of acknowledgement messages may thereby be increased, so that the number of messages that are received is maximized.

It may be required for a time period during which the new node 102 waits for receipt of acknowledgement messages to be limited to a preset amount of time, after which the suitability of the new node's position may be determined. In an embodiment of the present invention, the time period during which the new node 102 waits for receipt of acknowledgement messages may be set by the installer. The length of the period may be in accordance with an approximate number of neighboring nodes that are expected by the installer to be in a communication range of the new node 102. For example, for a new node 102 in a communication range of which three neighboring nodes are expected, it may be efficient for the waiting period to be set to approximately 3×period T, but for a new node 102 in a communication range of which one hundred nodes are expected, it may be most efficient for the waiting period to be set to approximately 100×period T. In particular, it may be efficient for the waiting period to be set to slightly more that the number of neighboring nodes expected to be in the communication range of the new node 102 multiplied by the period T, as will be explained below. Alternatively, the coefficient by which the period T is multiplied may be the expected highest number of selectable offsets or slightly greater than the expected highest number of selectable offsets of any single node expected to be in a communication range of the new node 102. For example, it may be expected that the communication range of the new node 102 encompasses only a first field node 101 that may choose from 10 offsets and a second field node 101 that may choose from 5 offsets. In this instance 10 or a slightly greater number may be selected as the coefficient.

In an embodiment of the present invention, the number of offsets from which a particular node may choose for transmission of an acknowledgement message may be set by the installer, for example, when the particular node is initially installed, although embodiments of the system and method may provide for later setting of the number of offsets. The number of offsets may be set in accordance with an approximate number of neighboring nodes that are expected by the installer to be, e.g., in the future, in a communication range of the particular node. Accordingly, the number of expected neighbors multiplied by the probability of choosing a particular offset may approximate 1. In particular, it may be desirable for, and a network installation protocol may require, the number of offsets to be set to slightly more than the number of expected neighbors. Accordingly, the number of expected neighbors multiplied by the probability of choosing a particular offset may be slightly less than 1. The greater the number of offsets is compared to the number of expected neighbors, the greater the chance that different nodes choose different offsets for transmitting the acknowledgement message. However, setting the number of offsets to an extremely high number may be an inefficient use of time.

Figure 3:
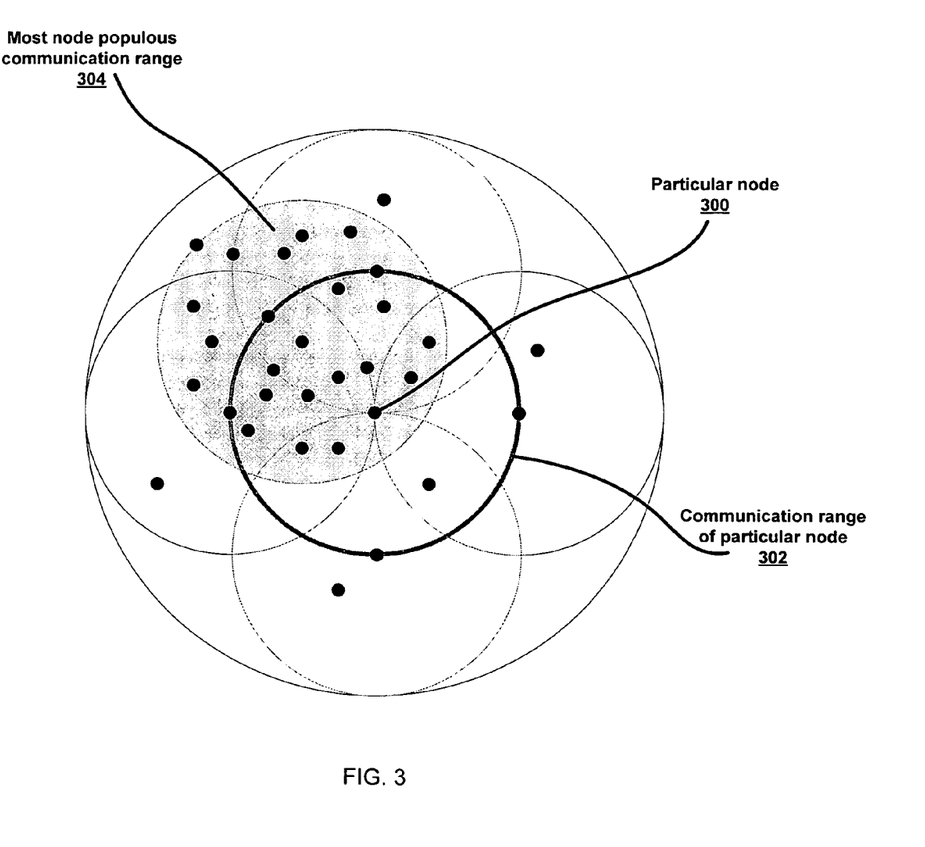
FIG. 3 is a diagram that illustrates an example of a most node populous communication range, which is a node communication range populated with more nodes than any other node communication range, of any node in a communication range of a particular node, the most node populous communication range selected for determining a number of selectable offsets for transmission of an acknowledgement message, according to an example embodiment of the present invention.

It will be appreciated that a number of expected neighbors of the particular node that are in the particular node's communication range may be different than a number of nodes expected to be in a communication range of new node 102 that is in the particular node's communication range. FIG. 3 is a diagram that illustrates the particular node's communication range and communication ranges of other nodes that are each in the communication range of the particular node 300. Nodes are illustrated as dots. The dot at the center represents the particular node 300. Communication ranges are illustrated as circles drawn about respective nodes at the center. The center circle represents the particular node's communication range 302. Portions of each communication range of each of the other nodes are not within the particular node's communication range. (FIG. 3 does not demarcate the communication range of each of the illustrated nodes.) Accordingly, variations of the above network installation protocols may be used. For example, FIG. 3 shows that there may be a high probability that a farthest reach of a communication range of any node that itself lies in the particular node's communication range is within or at a distance from the particular node 300 that equals twice the particular node's communication range 302. A network installation protocol may therefore require consideration of a number of neighboring nodes that are expected to be within two times the particular node's communication range. Another variation of the described installation protocols may require setting of the number based on an expected most node populous communication range within twice the particular node's communication range. For example, the shaded communication range 304 of FIG. 3 is a most node populous communication range of any of the nodes that are within the communication range of the particular node 300, since the shaded communication range 304 includes more nodes than a communication range of any other of the nodes in FIG. 3 that are within the communication range of the particular node 300. Therefore, with respect to FIG. 3, the number of offsets selectable by the particular node 300 maybe set based on the number of nodes in the shaded communication range 304.

The setting of a new node's waiting period may be performed so that it accommodates the way in which the number of offsets is set. For example, if nodes expected to be within a communication range of the new node 102 are expected to have a maximum choice of n offsets, it may be desirable for, and a network installation protocol may require, the waiting period of the new node 102 to be set to n×period T.

In an embodiment of the present invention, the setting of the waiting period of a node and/or the setting of the number of offsets from which a node may choose to transmit an acknowledgement message may be input via the input device 110 of the node.

In an embodiment of the present invention, for conservation of energy, nodes may periodically enter a sleep mode, from which each node periodically wakes up to check if it is receiving any message. To ensure that all neighboring nodes in the communication range of the new node 102 receive the neighbor-acknowledge-request message, the new node 102 may transmit as the neighbor-acknowledge-request message a tone that lasts longer than the inter-wakeup time period or periods of the nodes. According to the embodiment in which an acknowledgement message transmission protocol is provided that allows for selection of only time offsets that are multiples of the time period required for transmission of the acknowledgement message so that messages sent after different offsets do not collide, the protocol may provide that a first time at which an acknowledgement message may be sent is immediately after an end of the tone transmitted by the new node 102. Accordingly, all time offsets may be added to a same beginning time.

In an embodiment of the present invention, after a new node 102 determines that its location is suitable according to predetermined criteria, the node 102 may automatically begin a deployment procedure for establishing itself in the network to function as a network node. For example, with respect to a network for determining a presence of a hazardous substance in a certain environment, the deployed node may transmit data obtained from one or more of its sensors to the base node 100 (directly or indirectly). In an alternative embodiment, the deployment procedure may begin in response to input by an installer. For example, the new node 102 may output data indicating whether its location is suitable and/or indicating the number of its neighboring nodes. The installer may then determine, e.g., based on the output data, whether to deploy the new node 102.

In an embodiment of the present invention, during the deployment procedure, the new node 102 may determine all possible communication paths to the base node 100, and may set up a communication topology according to which its messages may be sent throughout the network to different field nodes 101 and to the base node 100.

Figure 4A:
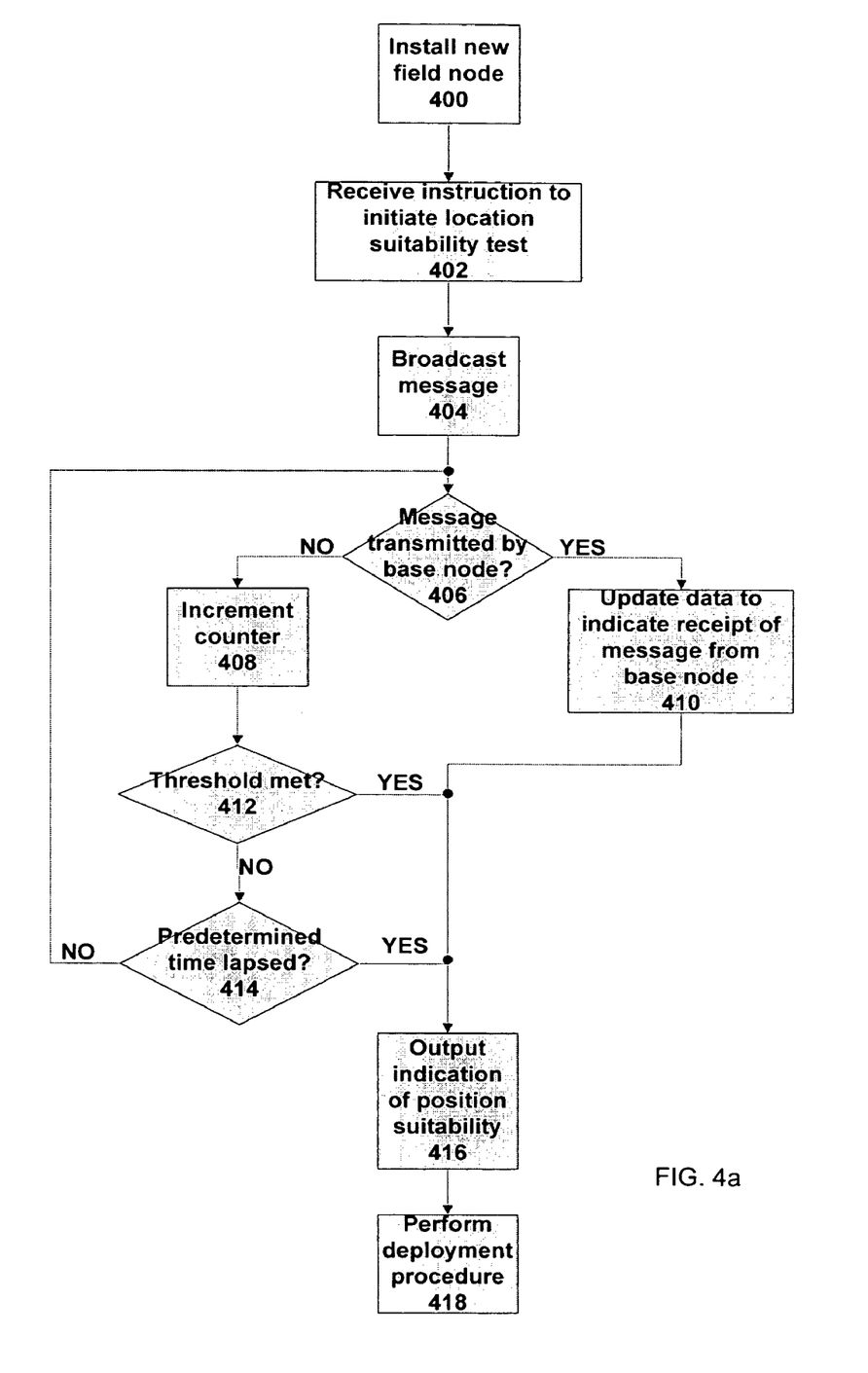
FIG. 4a is a flowchart that illustrates a method for integration of a new node into a network, according to an example embodiment of the present invention.

FIG. 4a is a flowchart that illustrates an example method for integration of a new field node 102 into a network according to an example embodiment of the present invention. At step (400), a new field node 102 may be installed. At step (402), the field node 102 may receive an instruction to initiate a procedure for determining its location's suitability, i.e., the field node 102 may be triggered to initiate a location suitability test. At step (404), the field node 102 may broadcast a neighbor-acknowledge-request message, e.g., a tone. At step (408), a counter of the field node 102 may be incremented for each received acknowledgement message, if any. In an embodiment of the present invention, the field node 102 may update different data depending on a type of received acknowledgement message, as described in detail above. According to this embodiment, at step (406), the field node 102 may determine whether a received acknowledgement message (if one is received) has been transmitted by a base node 100 or a neighboring field node 101. If the field node 102 determines that the acknowledgement message has been transmitted by a field node 101, step (408) may be performed. If the field node 102 determines that the acknowledgement message has been transmitted by the base node 100, the new field node 102 may, at step (410), update data indicating receipt of the acknowledgement message from the base node 100.

After step (408), the field node 102, e.g., a processor of the field node 102, may determine at step (412) whether a value of the counter is at (or above) a predetermined threshold number. If the threshold number is met (or exceeded), step (416) may be performed. Otherwise, step (414) may be performed. At step (414), the field node 102 may determine whether there has been a lapse of a predetermined time period from an end of transmission of the neighbor-acknowledge-request message. If the time period has lapsed, step (416) may be performed. Otherwise, the field node 102 may continue to wait for acknowledgement messages. Step (416) may also be performed subsequent to or instead of step (410).

At step (416), the field node 102 may output data indicating whether the position of the field node 102 is a suitable one. The data output at step (416) may correspond to whether performance of step (416) immediately follows step (412) or step (414), and whether performance of step (416) follows step (410) (or step (406)). In one embodiment, the data output at step (416) may directly correspond to which of steps (412), (410) (or (406)), and (414) performance of step (416) immediately follows. According to this embodiment, once it is determined or indicated that the acknowledgement message has been transmitted by the base node 100, step (416) may be performed regardless of whether the predetermined time period has lapsed. If step (416) immediately follows step (412), the output data may indicate that the field node's location is suitable for the network, since it has been determined at step (412) that the counter indicates sufficient neighbors in the new field node's communication range. If step (416) immediately follows step (410) (or (406) where step (416) is performed instead of step (410)), the output data may indicate that the field node's location is suitable for the network, since the data updated at step (410) indicates, or since it has been determined at step (406), that an acknowledgement message was received from the base node 100. A separate data update at step (410) may be omitted since, data may be output at step (416) indicating that the node's location is suitable in response to a single instance of receipt of an acknowledgement message from the base node 100. If step (416) follows step (414), the output data may indicate that the field node's location is unsuitable for the network, since it has been determined that the predetermined time period has lapsed without receipt of an acknowledgement message from the base node 100 or from sufficient neighboring field nodes.

Figure 4B:
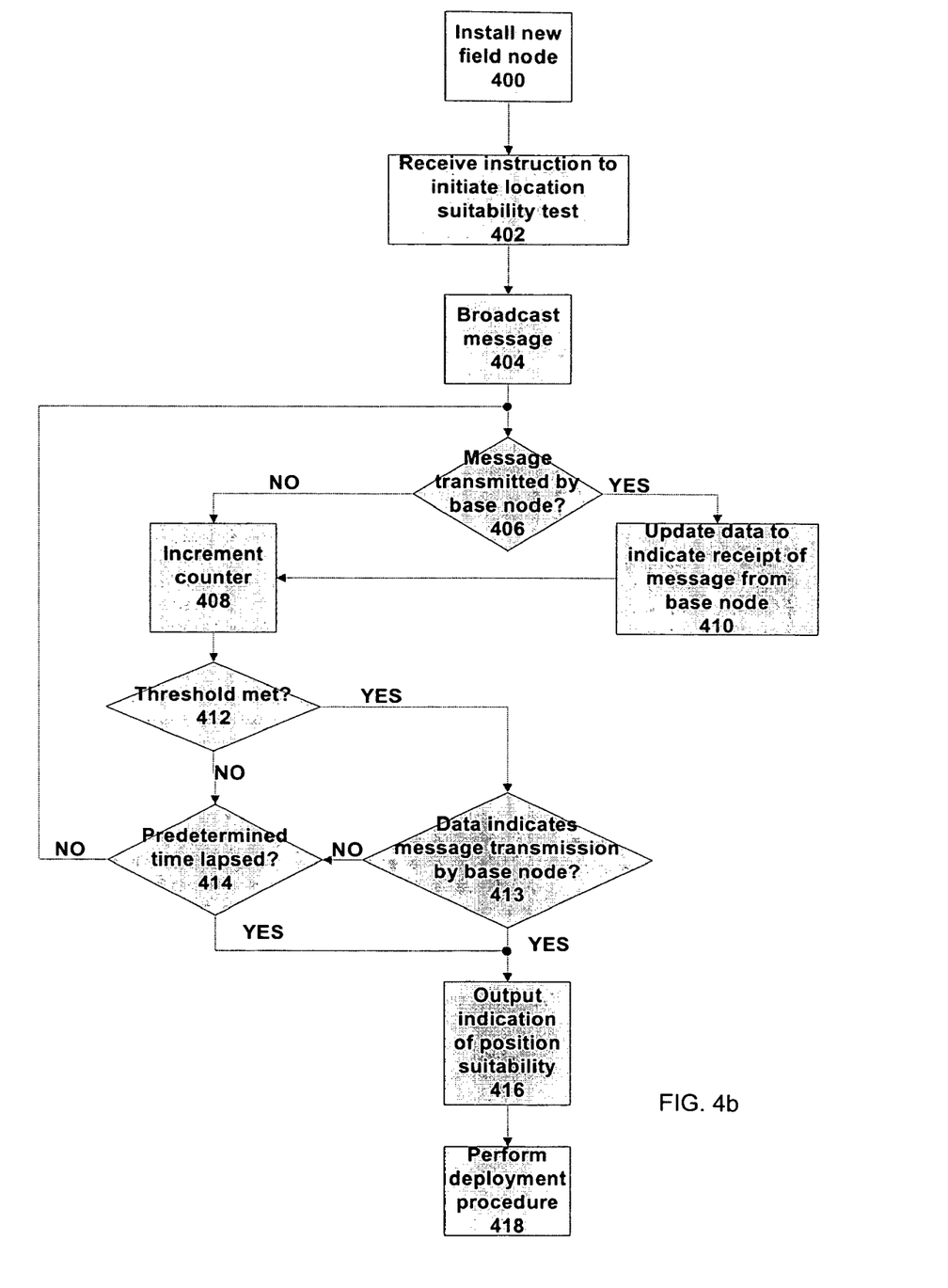
FIG. 4b is a flowchart that illustrates an alternative method for integration of a new node into a network, according to an example embodiment of the present invention.
Figure 4C:
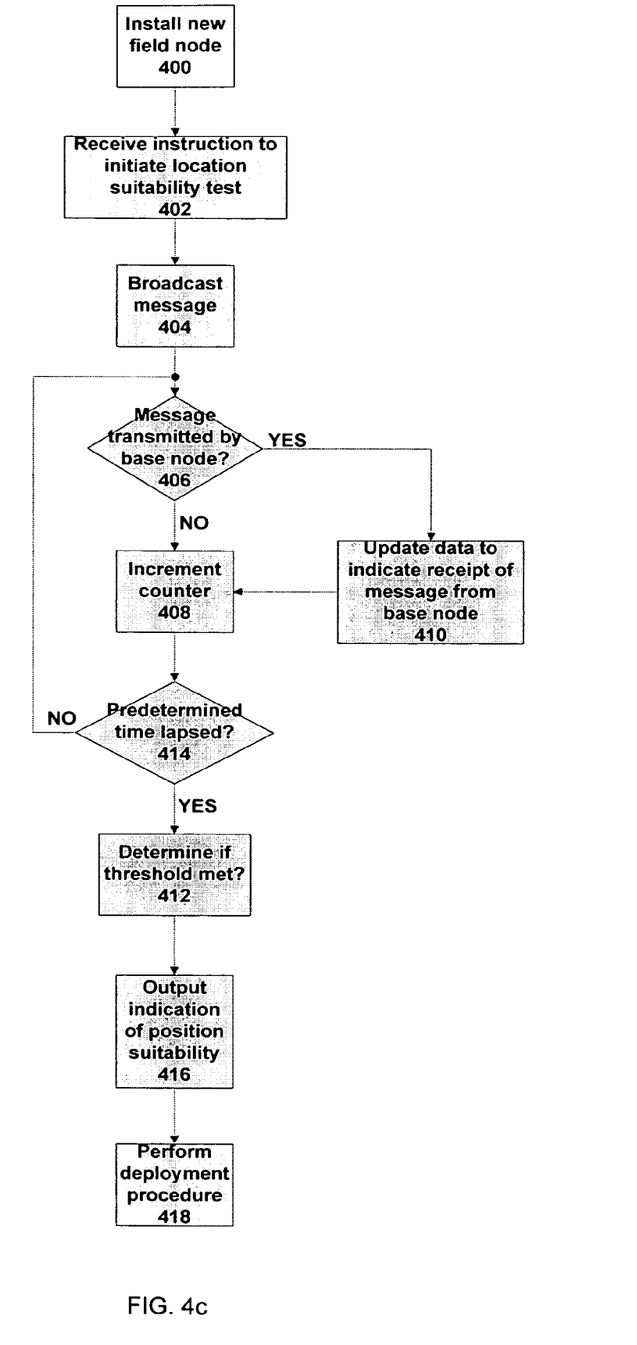
FIG. 4c is a flowchart that illustrates another alternative method for integration of a new node into a network, according to an example embodiment of the present invention.

In an embodiment of the present invention, the data output at step (416) may indicate the reason for the determination that the new field node's location is suitable for the network, if such a determination is made. In one embodiment, where conditions 1 and 2 are both satisfied, the output data may indicate this state. According to this embodiment, the system and method may provide for one or more of: (a) performance of step (414) following step (410); (b) performance of step (408) following step (410); (c) performance of step (412) following, instead of preceding, step (414), where step (412) is performed if it is determined at step (414) that the time period has lapsed, and where, immediately following step (412), step (416) is performed regardless of the determination of whether the counter value meets (or exceeds) the threshold number; and (d) performance of step (413) (not shown in FIG. 4a) to determine whether it has been indicated at step (410) that an acknowledgement message has been transmitted by the base node 100, where step (413) immediately follows step (412), and where, if it is determined that it has been indicated that an acknowledgement message was received from the base node 100, step (416) immediately follows step (413). Otherwise, step (414) follows step (413). For example, FIGS. 4b and 4c show alternative methods to that shown in FIG. 4a. The sequences shown in FIGS. 4a-c are exemplary and are not intended to be an exhaustive set of possible sequences. According to these alternative embodiments, it may be that the data output at step (416) does not correspond to which of steps (406) (or (410)), (412), and (414) performance of step (416) follows, but rather corresponds to data such as the counter data or data updated at step (410).

According to the sequence shown in FIG. 4b, for example, it may occur that the counter is incremented even after it is determined that the threshold number has been met (or exceeded) as long as transmission of an acknowledgement message by the base node 100 is not indicated and it has not been determined at step (414) that the time period has lapsed. In an embodiment of the present invention, the data output at step (416) may indicate the counter value aside from indicating whether the counter value meets (or exceeds) the predetermined threshold number.

According to the sequence shown in FIG. 4c, as long as the predetermined time has not lapsed, step (416) is not performed, even if conditions 1 and 2 are satisfied.

It may occur that satisfaction of one or both of conditions 1 and 2 is not indicated where step (416) is performed before consideration of all acknowledgement messages that reach the new field node 102. This may occur, for example, where it is determined at step (414) that the time period has lapsed before receipt and/or consideration of all of the acknowledgement messages.

At step (418), the new field node 102 may perform a deployment procedure, automatically after determining that its location is suitable, or in response to a user instruction.

Figure 5:
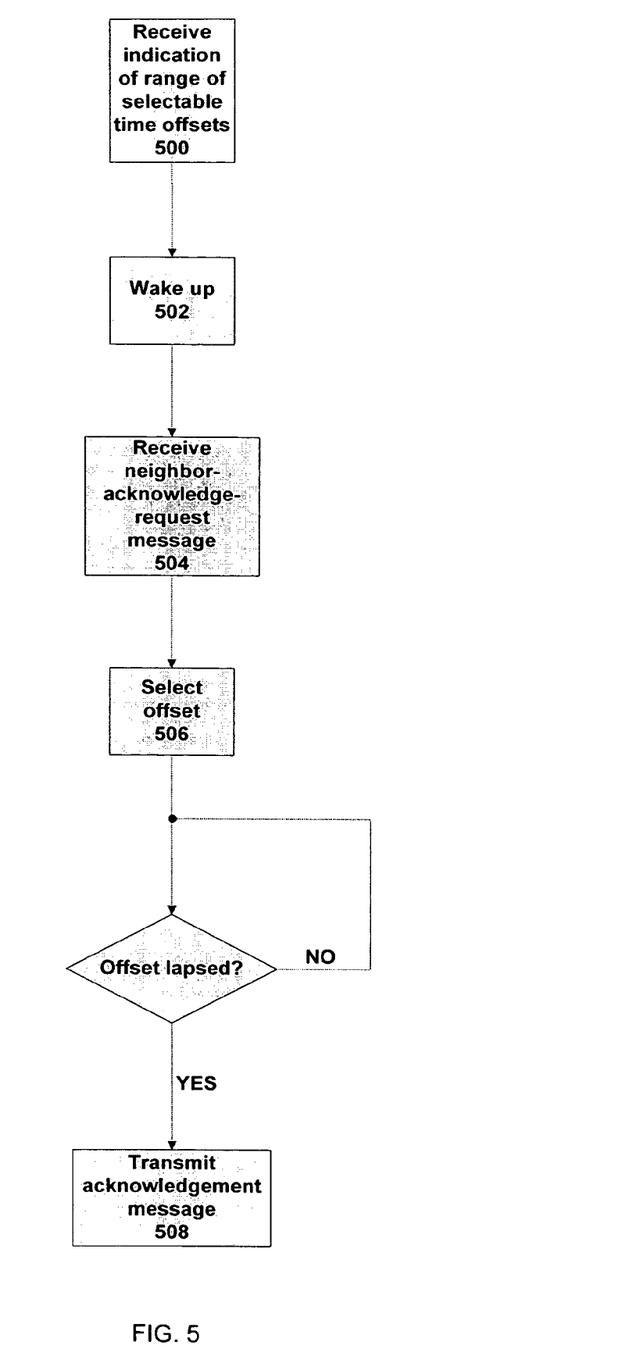
FIG. 5 is a flowchart that illustrates a method for transmitting an acknowledgement message, according to an example embodiment of the present invention.

FIG. 5 is a flowchart that illustrates an example method for transmitting an acknowledgement message according to an example embodiment of the present invention. At step (500), a node may receive input indicating a number of time offsets from a first time at which transmission of the acknowledgement message may be transmitted. At step (502), the node may wake up from a sleep mode. At step (504), the node may receive a neighbor-acknowledge-request message. At step (506), the node may select one of the offsets. At step (508), the node may transmit an acknowledgement message after lapse of the selected time offset. The sequence of FIG. 5 is shown by way of example only. For example, a single selection of an offset may be performed independent of receipt of a neighbor-acknowledge-request message to be used for all received neighbor-acknowledge-request messages.

What is claimed is:

1. A network installation method comprising:
    broadcasting a first message by a first node of a network to all of at least one second node of the network that is in a communication range of the first node;
    selecting by each of the at least one second node that receives the first message one of a corresponding plurality of time offsets;
    transmitting a second message to the first node by each of the at least one second node that receives the first message after passage of the second node's selected time offset from a first possible transmission time;
    at least one of (a) counting a number of second messages received in response to the first message and (b) determining a type of at least one of the second messages; and
    based on at least one of the number and the type, determining whether a location of the first node is suitable.

2. The method of claim 1, wherein, for the each of the at least one second node, the transmission of the second message is conditional upon that the second node has been at least one of deployed into the network and determined to be in a suitable location.

3. The method of claim 1, wherein the first possible transmission time is at an end of the broadcasting of the first message.

4. The method of claim 3, further comprising:
    entering by at least one node of the network into a sleep mode, the sleep mode being maintained for a predetermined time.

5. The method of claim 4, wherein the first message is a tone that is broadcast for a time that is longer than the predetermined time.

6. The method of claim 1, wherein a number of the plurality of offsets that are selectable by a particular one of the at least one second node is determined based on an estimated number of nodes expected to be in one of a communication range of the particular node, an area about the particular node having a radius equal to twice a radius of the communication range of the particular node, and an expected most node populous node communication range that falls completely within the area.

7. The method of claim 1, wherein each offset is equal to a multiple of a period of time that is at least as long as a transmission time of the second message.

8. The method of claim 1, further comprising:
    waiting for a period of time beginning at an end of the broadcasting of the first message before determining whether the location is suitable.

9. The method of claim 8, wherein the period of time is determined based on an expected highest number of offsets selectable by any single one of at least one node expected to be within the communication range of the first node.

10. The method of claim 1, wherein, of a plurality of second messages transmitted in response to the first message, transmission times of any message pair one of completely overlap and do not overlap at all.

11. The method of claim 1, wherein, of a plurality of second messages transmitted in response to the first message, for maximization of a number of the plurality of second messages that are received, transmission times of any message pair one of completely overlap and do not overlap at all.

12. The method of claim 1, wherein the type is one of a first type transmitted by a base node and a second type transmitted by a field node.

13. The method of claim 12, wherein the location is determined to be suitable if and upon a condition that at least one of the number is greater than a predetermined number and at least one first type of second message has been determined to have been received.

14. A network node, comprising:
    a transmitter that broadcasts a first message to all of at least one other node of the network that is in a communication range of the network node; and
    a receiver that receives, from each of the at least one other node, a second message transmitted by the other node (a) in response to the first message and (b) after passage of a time offset from the a first possible transmission time, the time offset being one of a plurality of time offsets that is selected by the other node;
    wherein the network node:
        at least one of (a) counts a number of second messages received in response to the first message and (b) determines type of at least one the second messages; and
        based on at least one of the number and the type, determines whether a location of the network node is suitable.

15. The network node of claim 14, further comprising:
    a counter that is incremented in response to receiving each received second message transmitted in response to the first message; and
    an output arrangement that provides an output indicating whether the location of the network node is suitable, wherein the output is the value of the counter.

16. The network node of claim 14, further comprising:
    an arrangement for determining whether the location is suitable; and an arrangement for automatically performing a deployment procedure if it is determined that the location is suitable.

17. A network, comprising:
a plurality of nodes including a first node and at least one second node that is in communication range of the first node;
wherein:
  the first node includes a transmitter to broadcast a first message to all of at the least one second node;
  each of the at least one second node:
    includes a receiver to receive the first message;
    is configured to select one of a corresponding plurality of time offsets; and
    includes a transmitter via which the second node is configured to transmit a second message to the first node after passage of the second node's selected time offset from a first possible transmission time; and
  the first node:
    includes a receiver to receive the second messages; and
    is configured to:
      at least one of (a) count a number of second messages received in response to the first message and (b) determine a type of at least one the second messages; and
      based on at least one of the number and the type, determine whether a location of the first node is suitable.

18. The method of claim 17, wherein the location of the first node is determined to be suitable if at least one of (a) the counted number of received second messages exceeds a threshold value and (b) the first node receives directly from a base node of the network a message transmitted by the base node in response to the first message.

19. A network installation method, comprising:
deploying a base node;
subsequently installing at least one first field node, each of which has an estimated communication range in which the base node is located;
for each of the at least one first field node:
  determining whether the field node's location is suitable; and
  deploying the field node if it is determined that the field node's location is suitable;
installing at least one second field node, each of which has an estimated communication range in which the base node is not located, if a number of deployed ones of the at least one first field node is above a threshold number; and
for each of the at least one second field node:
  determining whether the field node's location is suitable; and
  deploying the field node if it is determined that the field node's location is suitable;
wherein, for the each of the field nodes, the step of determining whether the location of the field node is suitable includes:
  broadcasting a first message by the field node to all of at least one other node of the network that is in a communication range of the field node;
  receiving, by the field node and from each of the at least one other node, a second message transmitted by the other node (a) in response to the first message and (b) after passage of a time offset from a first possible transmission time, the time offset being one of a plurality of time offsets that is selected by the other node;
  at least one of (a) counting a number of second messages received in response to the first message and (b) determining a type of at least one of the second messages; and
  using at least one of the number and the type for the determination of the suitability of the location of the field node.

20. The method of claim 19, wherein a particular node's location is suitable if it is determined that there is at least one of the base node and field nodes numbering more than the threshold number within a communication range of the particular node.

21. The method of claim 19, wherein, for the each of the field nodes, the location of the field node is determined to be suitable if and conditional upon that at least one of (a) the counted number is greater than the threshold number and (b) at least one first type of second message has been determined to have been received by the field node.

22. The method of claim 21, wherein:
each of the second messages is either a first type of second message or a second type of second message;
the first type of second message is a message transmitted by the base node; and
the second type of second message is a message transmitted by a field node.

* * * * *

UNITED STATES PATENT AND TRADEMARK OFFICE
CERTIFICATE OF CORRECTION

PATENT NO.       : 7,606,173 B2                                              Page 1 of 1
APPLICATION NO. : 11/513744
DATED            : October 20, 2009
INVENTOR(S)      : Dhananjay Lal It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 526 days.

Signed and Sealed this

Fifth Day of October, 2010

David J. Kappos
*Director of the United States Patent and Trademark Office*